(12) United States Patent
Noh et al.

(10) Patent No.: US 10,805,534 B2
(45) Date of Patent: Oct. 13, 2020

(54) IMAGE PROCESSING APPARATUS AND METHOD USING VIDEO SIGNAL OF PLANAR COORDINATE SYSTEM AND SPHERICAL COORDINATE SYSTEM

(71) Applicant: KOREA ADVANCED INSTITUTE OF SCIENCE AND TECHNOLOGY, Daejeon (KR)

(72) Inventors: Junyong Noh, Daejeon (KR); Hanui Lee, Daejeon (KR); Sangwoo Lee, Daejeon (KR); Bumki Kim, Daejeon (KR); Jungjin Lee, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/275,430

(22) Filed: Feb. 14, 2019

(65) Prior Publication Data

US 2020/0145579 A1    May 7, 2020

Related U.S. Application Data

(60) Provisional application No. 62/754,000, filed on Nov. 1, 2018.

(51) Int. Cl.
*H04N 5/232* (2006.01)
*G06T 3/40* (2006.01)
*G06T 3/00* (2006.01)

(52) U.S. Cl.
CPC ....... *H04N 5/23238* (2013.01); *G06T 3/0087* (2013.01); *G06T 3/0093* (2013.01); *G06T 3/4038* (2013.01)

(58) Field of Classification Search
CPC ... G06T 3/4038; G06T 3/0093; G06T 3/0087; H04N 5/23238
See application file for complete search history.

(56) References Cited

U.S. PATENT DOCUMENTS

| | | | | |
|---|---|---|---|---|
| 6,549,215 B2* | 4/2003 | Jouppi | ................. | G05D 1/0246 345/660 |
| 7,940,299 B2* | 5/2011 | Geng | ..................... | H04N 5/232 348/143 |
| 9,219,860 B1* | 12/2015 | Kozko | ............... | H04N 5/23238 |
| 2002/0075258 A1* | 6/2002 | Park | ....................... | H04N 5/232 345/419 |
| 2004/0017386 A1* | 1/2004 | Liu | .................. | G08B 13/19643 345/647 |
| 2006/0056056 A1* | 3/2006 | Ahiska | ............. | G08B 13/19608 359/690 |
| 2007/0285550 A1* | 12/2007 | Son | ........................ | H04N 5/232 348/335 |
| 2008/0030592 A1* | 2/2008 | Border | ................... | H04N 5/232 348/218.1 |
| 2009/0256908 A1* | 10/2009 | Chen | ................ | G08B 13/19641 348/143 |

(Continued)

*Primary Examiner* — David E Harvey

(57) ABSTRACT

The present disclosure relates to an image processing apparatus and method for transforming image data of a spherical coordinate system corresponding to image data of a planar coordinate system without transforming the image data of the planar coordinate system, and stitching the transformed image data of the spherical coordinate system to the image data of the planar coordinate system.

19 Claims, 18 Drawing Sheets

(56) References Cited

U.S. PATENT DOCUMENTS

| | | | |
|---|---|---|---|
| 2010/0238327 A1* | 9/2010 | Griffith | H04N 5/272 348/240.99 |
| 2012/0026366 A1* | 2/2012 | Golan | H04N 5/23258 348/240.2 |
| 2012/0075489 A1* | 3/2012 | Nishihara | H04N 5/23296 348/222.1 |
| 2017/0332117 A1* | 11/2017 | Haritaoglu | H04N 21/6581 |
| 2018/0181358 A1* | 6/2018 | Asai | G06F 3/1423 |
| 2018/0182065 A1* | 6/2018 | Yoshida | G06T 3/0062 |
| 2019/0188828 A1* | 6/2019 | Aggarwal | G06T 3/0087 |
| 2020/0007751 A1* | 1/2020 | Itoh | H04N 5/268 |

* cited by examiner

FIG. 6
(A)
(B)
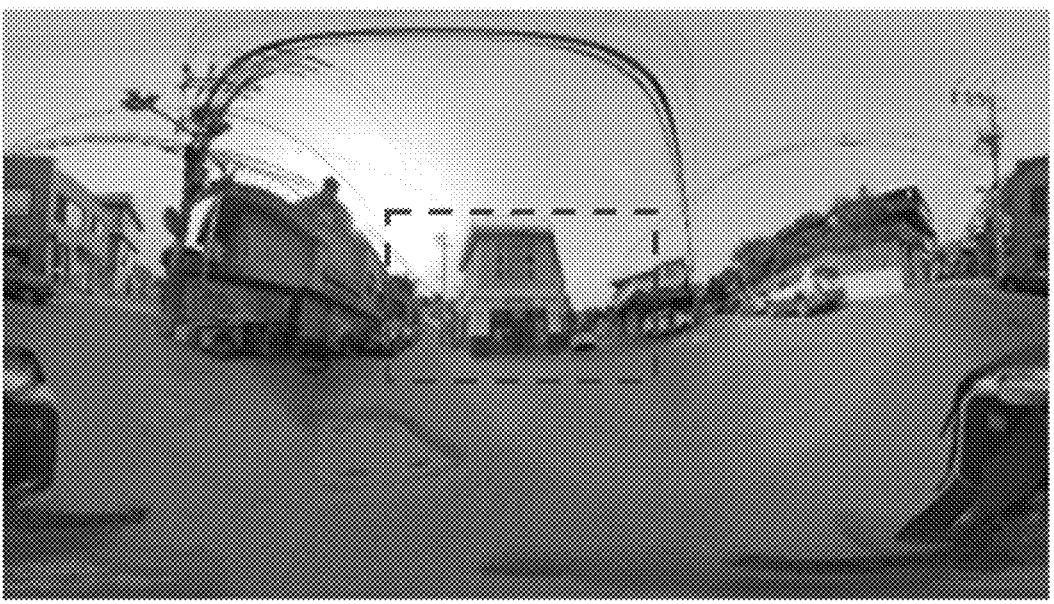

FIG. 9

| | Alignment |
|---|---|
| (1) | $E_{data} = \sum_k \left\| \sum_j \omega^f_{j,k} \hat{v}_{j,k} - f^M_k \right\|^2$ |
| (2) | $v_1 = v_2 + u(v_3 - v_2) + vR_{90}(v_3 - v_2)$ |
| (3) | $E_{sim}(\hat{v}_1) = \sum \|\hat{v}_1 - (\hat{v}_2 + u(\hat{v}_3 - \hat{v}_2) + vR_{90}(\hat{v}_3 - \hat{v}_2))\|^2$ |
| (4) | $E = E_{data} + \alpha E_{sim}$ |

FIG. 12

| | Warping |
|---|---|
| (5) | $E_b = \sum_k \left\| \sum_j \omega^b_{j,k} \hat{v}_{j,k} - b^M_k \right\|^2$ |
| (6) | $E_l = \sum_k \left\| \sum_j \omega^l_{j,k} \hat{v}_{j,k} - l_k \right\|^2$ |
| (7) | $E_s(\hat{v}_1) = \sum \|\hat{v}_1 - (\hat{v}_2 + u(\hat{v}_3 - \hat{v}_2) + vR_{90}(\hat{v}_3 - \hat{v}_2))\|^2$<br>subject to<br>$\beta = \begin{cases} \beta_1 & \text{if the vertex face is in } \phi(I^M_t) \\ \beta_2 & \text{otherwise} \end{cases}$ |
| (8) | $E_t = \sum_i \left\| v_{i,t} - \sum_{d=1}^{W} \frac{1}{d} \hat{v}_{i,t-d} \right\|^2$ |
| (9) | $\arg\min_{\hat{v}} E_b + \lambda_l E_l + \lambda_s E_s + \lambda_t E_t$ |

FIG. 13
(A)
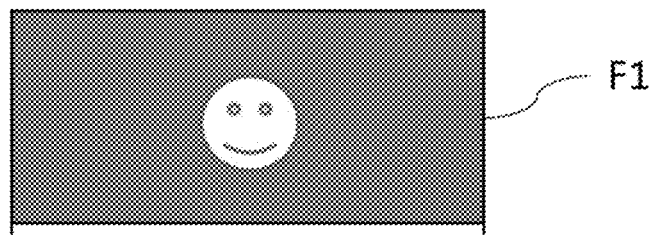
F1
(B)
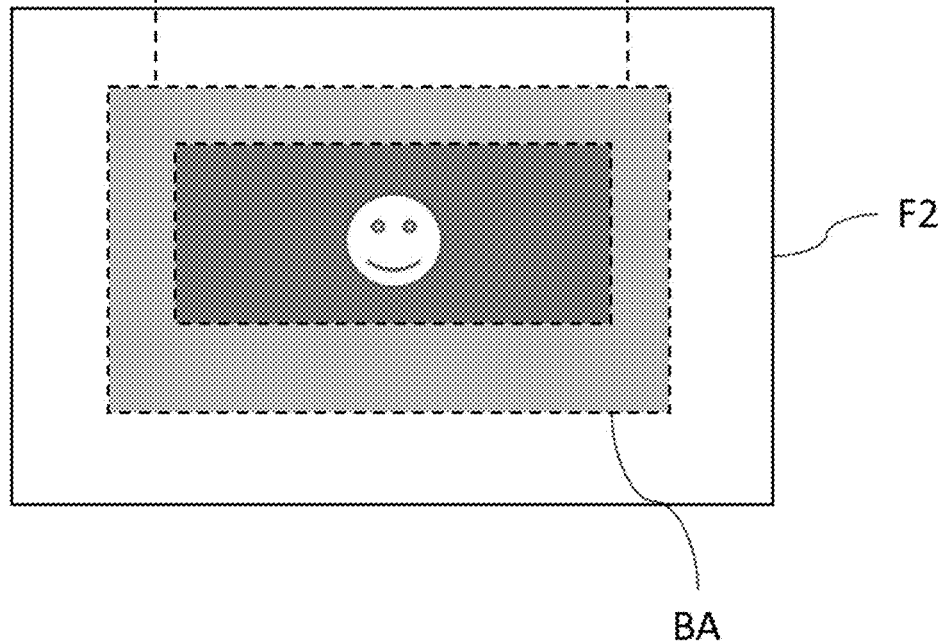
F2
BA

FIG. 14
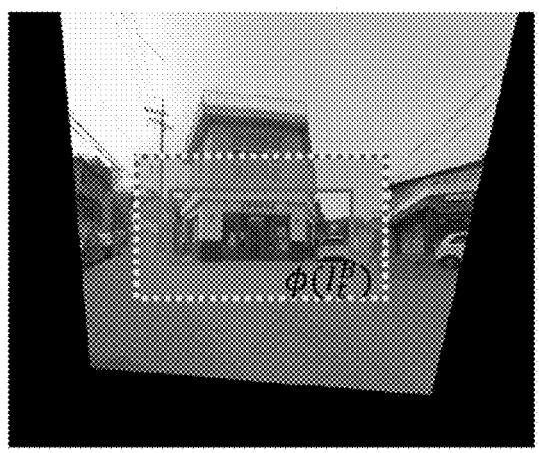 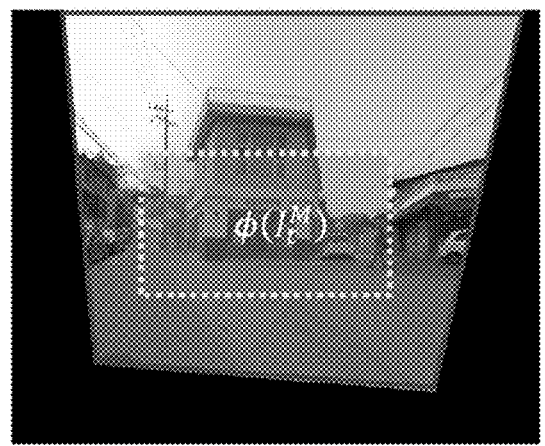
(A)                          (B)

IMAGE PROCESSING APPARATUS AND METHOD USING VIDEO SIGNAL OF PLANAR COORDINATE SYSTEM AND SPHERICAL COORDINATE SYSTEM

CROSS-REFERENCE TO RELATED APPLICATION

This application claims benefit of Junyong Noh et al., U.S. Provisional Application No. 62/754,000, entitled "IMAGE PROCESSING APPARATUS AND METHOD USING VIDEO SIGNAL OF PLANAR COORDINATE SYSTEM AND SPHERICAL COORDINATE SYSTEM", filed on Nov. 1, 2018, which is herein incorporated by reference in its entirety.

BACKGROUND OF THE INVENTION

Field of the Invention

The present disclosure relates to an image processing apparatus and method using image data of a planar coordinate system and image data of a spherical coordinate system, and more particularly, to an image processing apparatus and method for transforming image data of a spherical coordinate system corresponding to image data of a planar coordinate system without transforming the image data of the planar coordinate system, and stitching the transformed image data of the spherical coordinate system to the image data of the planar coordinate system.

Description of the Related Art

Recently, panoramic contents, which may provide a sense of immersion to viewers, are gaining popularity.

The panoramic contents may be implemented on a screen that is capable of giving a relatively wide field of view, such as Screen X or IMAX Dome.

When the resolution of the panoramic content is raised, the size of the data may become excessively increased due to the wide angle of view.

However, if the resolution is lowered to prevent an excessive increase in the size of the panoramic content, the immersion feeling of viewers may be deteriorated.

SUMMARY OF THE INVENTION

The present disclosure is directed to providing an image processing apparatus and method for generating a panoramic image by using high-definition image data of a planar coordinate system and low-definition image data of a spherical coordinate system.

In one aspect of the present disclosure, there is provided an image processing method using image data of a planar coordinate system and image data of a spherical coordinate system, comprising: an inputting step of imputing first image data represented by the planar coordinate system and second image data represented by the spherical coordinate system; an aligning step of aligning the second image data to the first image data; a first warping step of warping the aligned second image data; a stitching step of stitching the first image data and the warped second image data; and a displaying step of displaying an image according to the stitched image data.

In addition, the image according to the first image data may correspond to a first area of a display area, and the image according to the warped second image data may correspond to a second area including the first area.

In addition, the resolution of the image according to the first image data may be higher than the resolution of the image according to the second image data.

In addition, the image according to the first image data and the image according to the second image data may be captured by different cameras.

In addition, the image according to the second image data may be captured by a panoramic camera.

In addition, in the aligning step, the second image data may be transformed so that the second image data is aligned to the first image data.

In addition, the aligning step may include: a first transforming step of transforming the second image data to planar second image data represented by the planar coordinate system; a matching step of matching a feature point of the planar second image data with a feature point of the first image data; a second transforming step of transforming the planar coordinate information about the feature point of the planar second image data and the feature point of the first image data, which are matched, into spherical coordinate information; and a second warping step of warping the second image data based on difference information of the spherical coordinate information of the feature points transformed in the second transforming step.

In addition, in the second warping step, the warped second image data may be warped corresponding to the first image data.

In addition, the second warping step may further include a boundary matching step of matching boundaries of the image according to the first image data and the image according to the transformed second image data.

In addition, the second warping step may further include a line preserving step of correcting line distortion in the image according to the second image data.

In addition, the aligning step may include: transforming the second image data to cube second image data that is a cube map coordinate system image with six surfaces, represented based on the planar coordinate system; matching a feature point of the cube second image data and a feature point of the first image data; transforming the planar coordinate information about the feature point of the cube second image data and the feature point of the first image data, which are matched, to spherical coordinate information; obtaining a rotation matrix representing a spatial location relationship of the first image data and the second image data by using the feature point of the cube second image data and the feature point of the first image data, which are transformed to the spherical coordinate information; and aligning a location of the second image data based on the rotation matrix.

In another aspect of the present disclosure, there is also provided an image processing apparatus using image data of a planar coordinate system and image data of a spherical coordinate system, comprising: a first camera corresponding to first image data represented by the planar coordinate system; a second camera corresponding to second image data represented by the spherical coordinate system; a driver configured to process the first image data and the second image data to output stitched image data in which the first image data and the second image data are stitched; and a display configured to display an image according to the stitched image data.

In addition, the driver may include: an aligning part configured to align the second image data to the first image data; a warping part configured to warp the second image data aligned by the aligning part; and a stitching part configured to stitch the first image data and the warped second image data, wherein the display displays the image according to the stitched image data.

In addition, the resolution of the image according to the first image data may be higher than the resolution of the image according to the second image data, and the second camera may be a panoramic camera.

The image processing apparatus and method according to the present disclosure stitches low-definition image data of a spherical coordinate system to high-definition image data of a planar coordinate system, thereby preventing the data size of a panoramic image from being excessively increased while suppressing the degradation of the immersion feeling of viewers.

BRIEF DESCRIPTION OF THE DRAWINGS

The above and other features and advantages will become more apparent to those of ordinary skill in the art by describing in detail exemplary embodiments with reference to the attached drawings, in which:

FIGS. 5 to 19 are diagrams for illustrating an image processing method using image data of a planar coordinate system and image data of a spherical coordinate system according to an embodiment of the present disclosure.

In the following description, the same or similar elements are labeled with the same or similar reference numbers.

DETAILED DESCRIPTION

Figure 1:
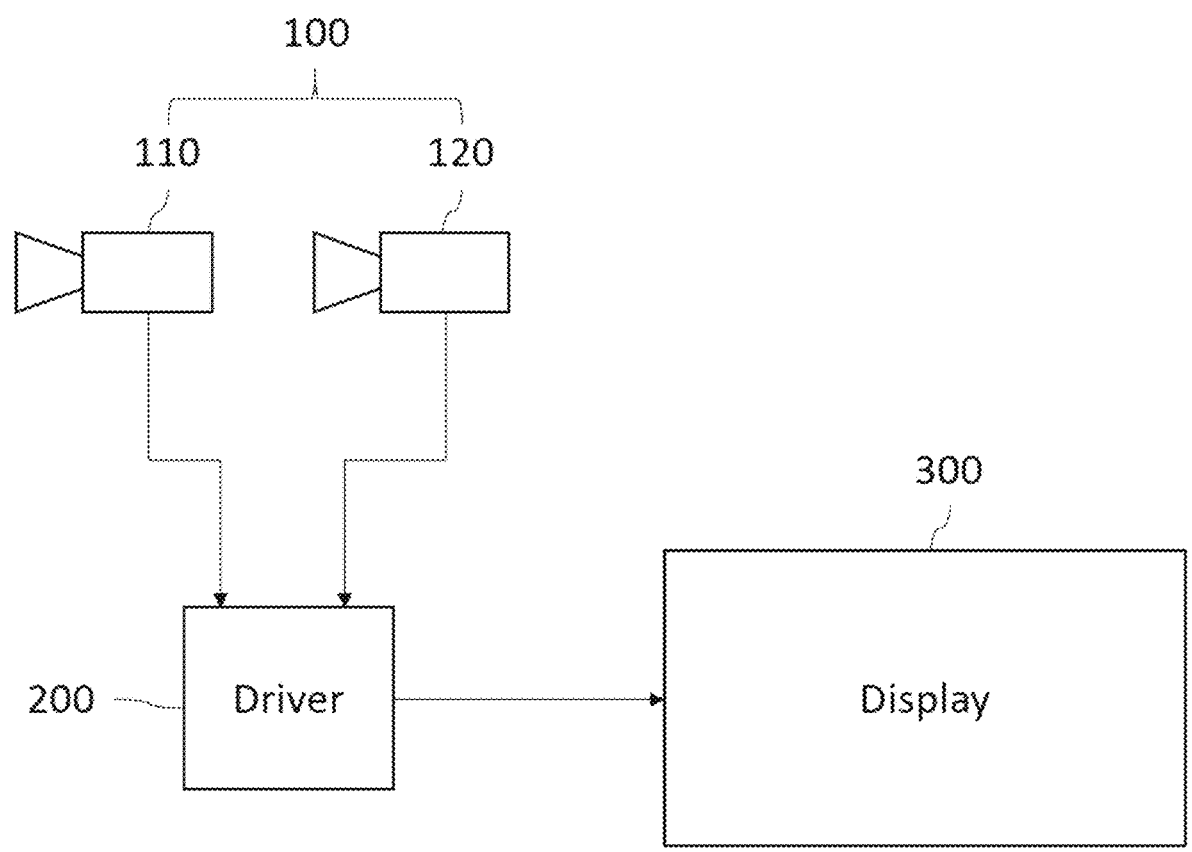
FIGS. 1 to 4 are diagrams for illustrating an image processing apparatus using image data of a planar coordinate system and image data of a spherical coordinate system according to an embodiment of the present disclosure.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

FIGS. 1 to 4 are diagrams for illustrating an image processing apparatus using image data of a planar coordinate system and image data of a spherical coordinate system according to an embodiment of the present disclosure.

Referring to FIG. 1, an image processing apparatus according to the present disclosure includes a camera part 100 for capturing an image, a driver 200 for processing image data corresponding to an image captured by the camera part 100, and a display part 300 for displaying a predetermined image corresponding to the image data processed by the driver 200.

The camera part 100 may acquire first image data represented by a planar coordinate system and second image data represented by a spherical coordinate system by capturing a predetermined image.

Figure 2:
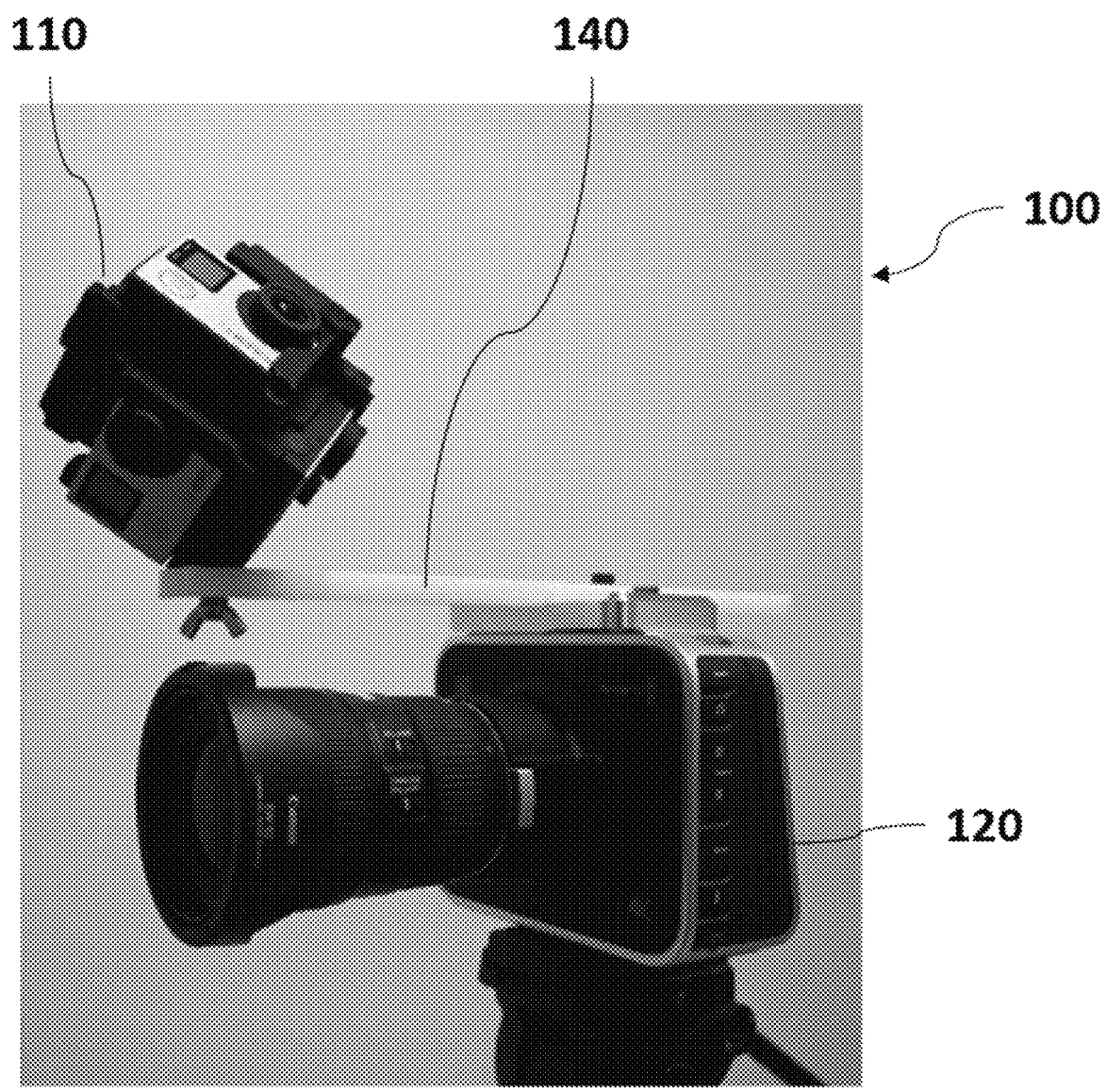

To this end, as shown in FIGS. 1 and 2, the camera part 100 may include a first camera 110 for acquiring the first image data and a second camera 120 for acquiring the second image data.

Here, the first camera 110 may be a high definition camera and the second camera 120 may be a panoramic camera. Accordingly, the resolution of the image according to the first image data corresponding to the first camera 110 may be higher than the resolution of the image according to the second image data corresponding to the second camera 120.

In FIG. 2, the reference sign 140 may represent a bridge for connecting the first camera 110 and the second camera 120.

For effective image processing, locations of the first camera 110 and the second camera 120 may be adjusted so that a lens of the first camera 110 and a lens of the second camera 120 are located close to each other.

Moreover, it may also be desirable that a view direction of the first camera 110 and a view direction of the second camera 120 are matched as much as possible.

The driver 200 may receive the first image data from the first camera 110 and receive the second image data from the second camera 120. In addition, the driver 200 may stitch the first image data and the second image data through a predetermined process and output the stitched image data.

Figure 3:
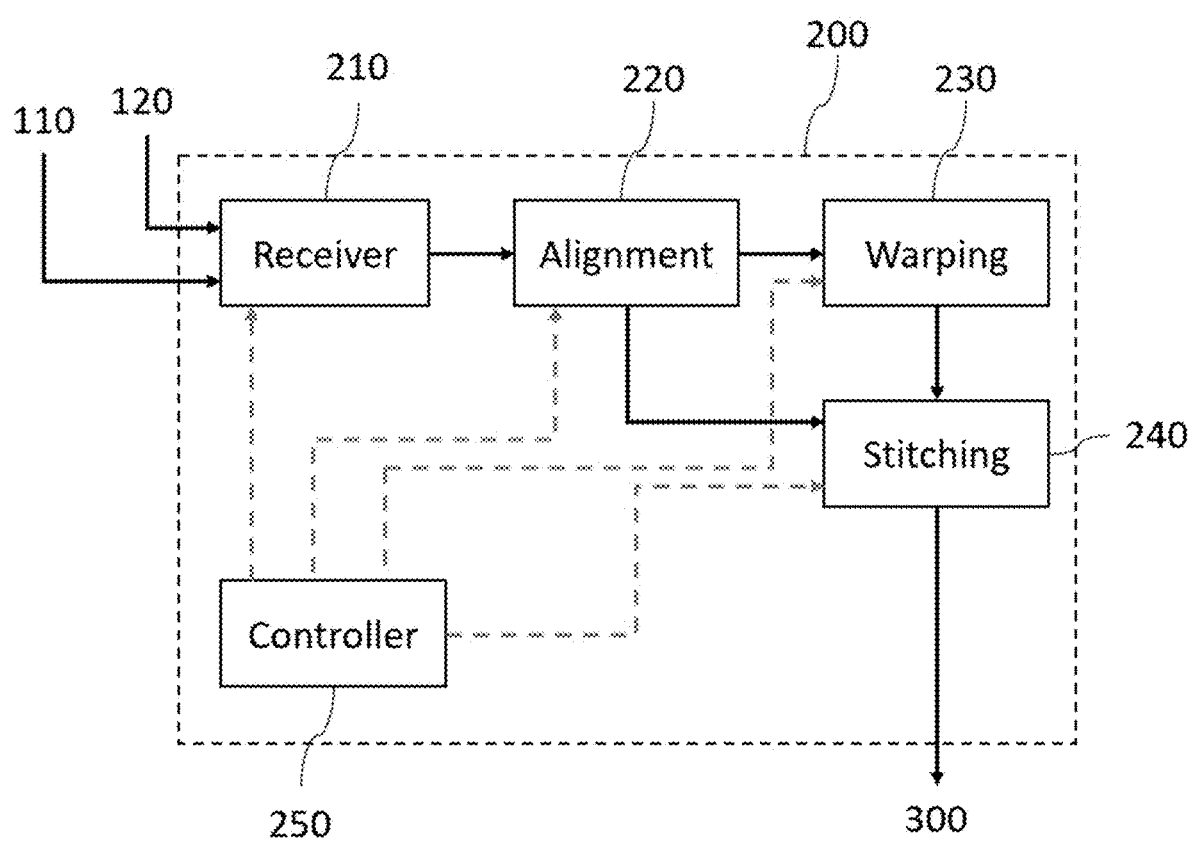

To this end, as shown in FIG. 3, the driver 200 may include a receiving part 210, an aligning part 220, a warping part 230, a stitching part 240, and a control part 250.

The receiving part 210 may receive the first image data and the second image data from the camera part 100.

The aligning part 220 may align the second image data to the first image data.

The warping part 230 may warp the second image data aligned by the aligning part 220.

The stitching part 240 may stitch the first image data and the warped second image data.

The function and operation of the driver 200 may be more clearly understood through the following description.

The display 300 may display an image according to the stitched image data by the driver 200.

Figure 4:
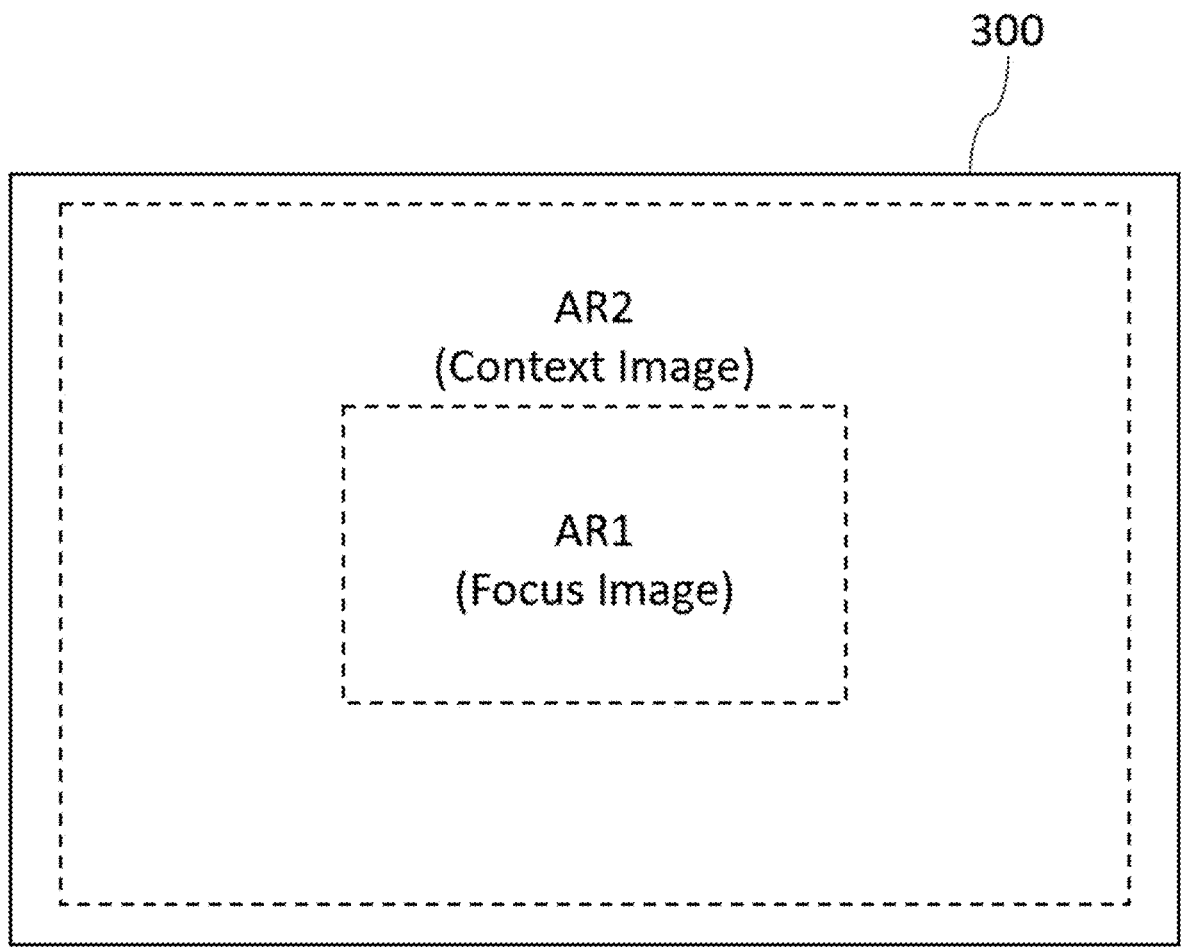

To this end, as shown in FIG. 4, the display 300 may include a first area AR1 corresponding to the first image data and a second area AR2 corresponding to the second image data.

An image corresponding to the first image data is displayed in the first area AR1 of the display 300, and an image corresponding to the second image data is displayed in the second area AR2.

In another aspect, the image according to the first image data may correspond to the first area AR1 of the display area, and the image according to the warped second image data may correspond to the second area AR2 including the first area AR1.

Here, even though the display 300 is depicted as having one screen, the display 300 may also include a plurality of screens. The method according to the present disclosure may also be applied even in this case.

FIGS. 5 to 19 are diagrams for illustrating an image processing method using image data of a planar coordinate system and image data of a spherical coordinate system according to an embodiment of the present disclosure. The features already explained above will not be described in detail again.

Figure 5:
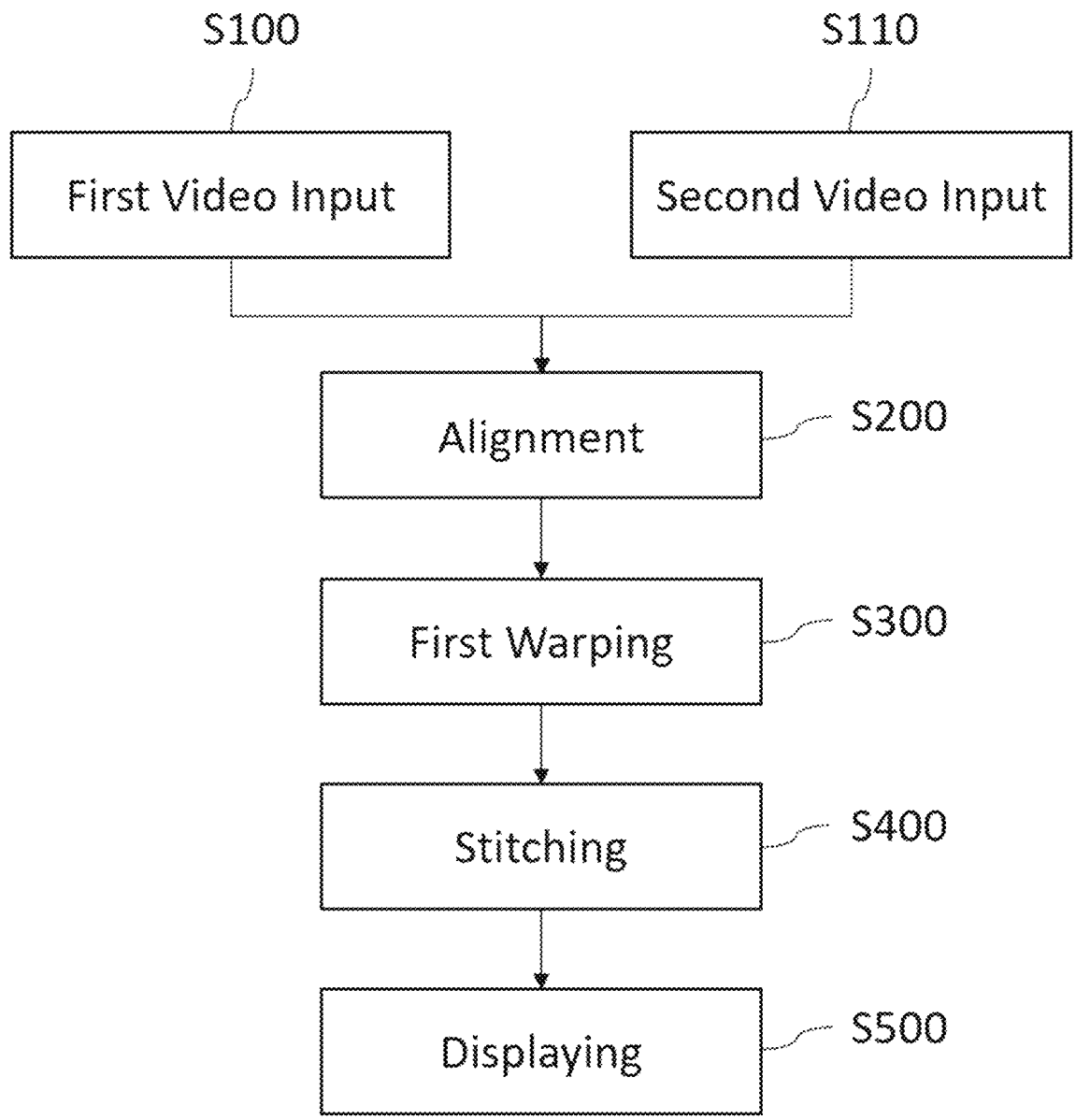

Referring to FIG. 5, in the image processing method according to the present disclosure, first image data may be acquired first (S100), and then second image data may be acquired (S110).

An example of an image according to the first image data and the second image data is shown in FIG. 6.

The portion (A) of FIG. 6 shows an example of the image according to the first image data, and the portion (B) of FIG. 6 shows an example of the image according to the second image data.

The image according to the first image data and the image according to the second image data may be captured by different cameras.

For example, the first image data may be acquired by a high definition camera, and the second image data may be captured by a panoramic camera.

Here, although it is depicted that the image according to the first image data and the image according to the second image data have the same width, the width of the image according to the second image data may be greater.

In the portion (B) of FIG. 6, the image according to the second image data may have a portion where the image is bent, since it is captured by the panoramic camera.

Moreover, in the portion (B) of FIG. 6, a region indicated by a red dotted line may correspond to a region where the image according to the first image data of the portion (A) of FIG. 6 is stitched.

As described above, the second image data contains data that is not included in the first image data. In other words, the second image data may include information about a surrounding image of the first image data.

Considering this, the image corresponding to the first image data may be called a focus image, and the image corresponding to the second image data may be called a context image.

After the first image data and the second image data are acquired, the second image data may be aligned to the first image data (S200). In detail, in the aligning step S200, the second image data may be transformed so that the second image data is aligned to the first image data. The first image data may remain unchanged without being transformed.

The aligning step S200 may be performed in two ways.

Figure 7:
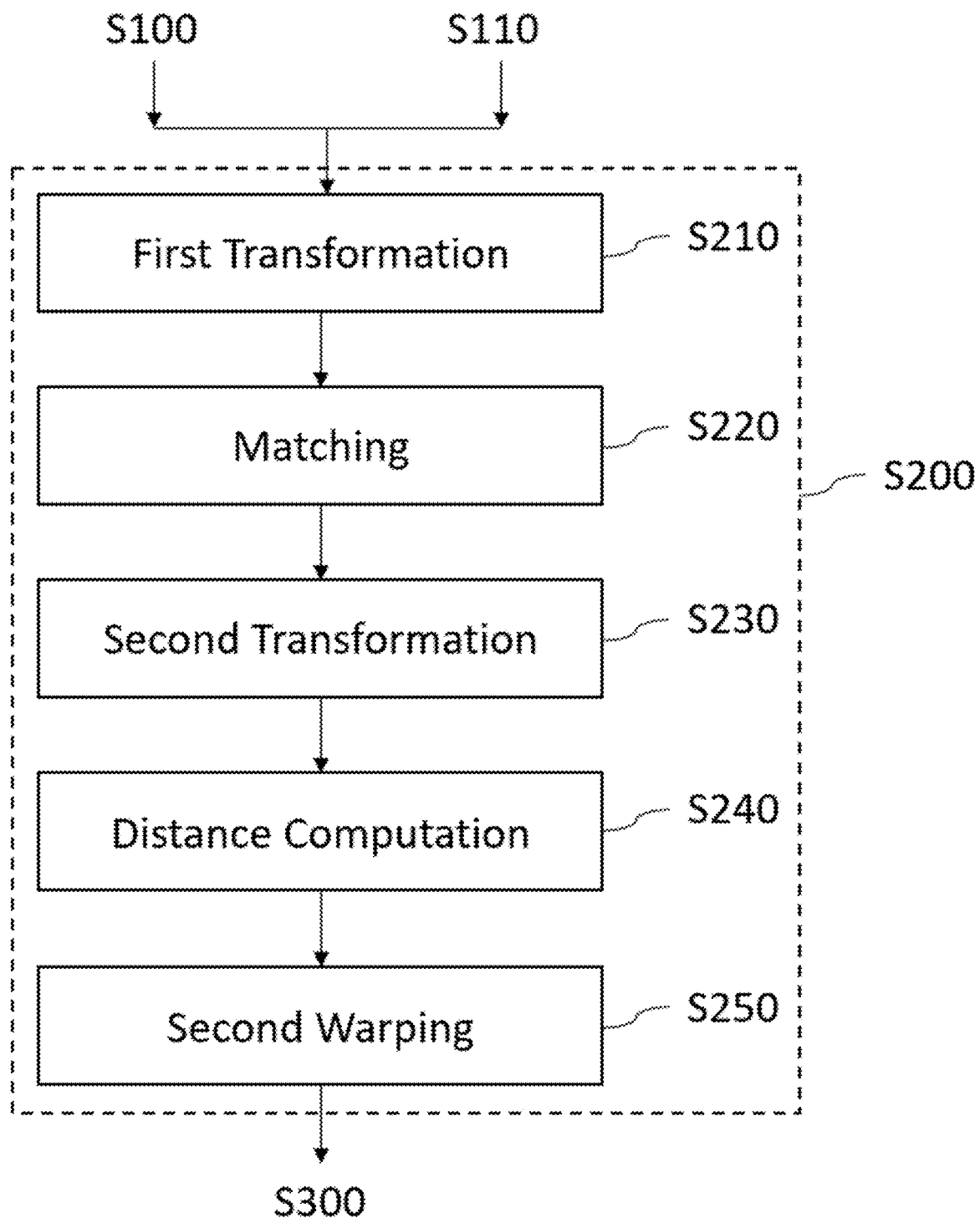

First, as shown in FIG. 7, the first method includes a first transforming step S210, a matching step S220, a second transforming step S230, a distance computing step S240, and a warping step S250.

The second image data may be transformed into planar second image data represented by a planar coordinate system (the first transforming step S210), and then a feature point of the planar second image data may be matched with a feature point of the first image data (the matching step S220).

Figure 8:
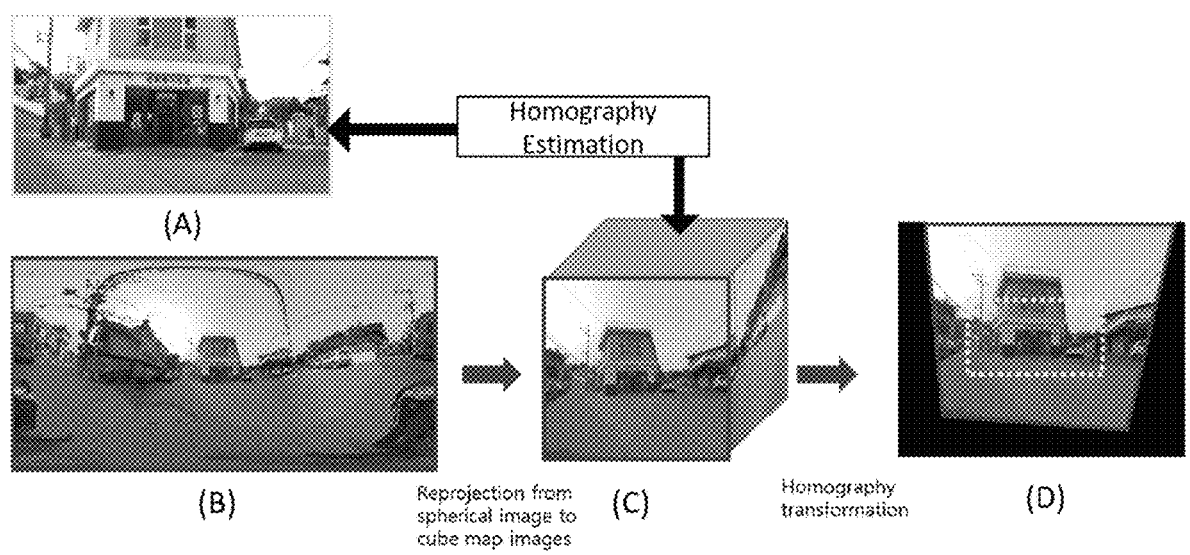

For example, as shown in FIG. 8, the second image data (B) may be projected (C) from the spherical coordinate system to the planar coordinate system by using a cube mapping technique.

A predetermined feature point may be detected from the cube-mapped second image data, and coordinate information on the detected feature point may be acquired. Here, the feature point may be data related to a predetermined object, an edge, a shade, and the like in the image.

After that, the cube-mapped second image data may be subjected to homography transformation based on homography estimation. The homography-transformed second image data has a planar coordinate system.

In this way, the image data of the spherical coordinate system may be transformed into the image data of the planar coordinate system.

After that, warping (the second transforming step S230) may be performed to remove errors generated by data transformation.

In detail, the planar coordinate information about the feature point of the planar second image data and the feature point of the first image data, which are matched, may be transformed into spherical coordinate information (the second transforming step S230). For example, the feature point included in the planar second image data transformed from the spherical coordinate system to the planar coordinate system may be transformed into the spherical coordinate system again, and also the feature point included in the first image data having the planar coordinate system may be transformed into the spherical coordinate system. For this, the inverse nomography transformation technique may be used.

After that, the distance between the matched feature points may be computed (the computing step S240) from the result of the second transforming.

For example, it is assumed that a predetermined first feature point included in the planar second image data and transformed into a spherical coordinate system is called a 1-1 feature point, and a second feature point included in the first image data having a planar coordinate system and corresponding to the first feature point and transformed into a spherical coordinate system is called a 2-1 feature point.

In the computing step, the distance between the 1-1 feature point and the 2-1 feature point may be computed.

After that, the second image data may be warped (the warping step S250) based on the difference information of the spherical coordinate information of the feature points transformed in the second transforming step S230, namely the distance between the matched feature points.

The method of warping the second image data will be described in more detail as follows with reference to FIG. 9.

The second image data may be warped in a direction along which the sum (Equation 4) of the energy calculated by Equation 1 and the energy calculated by Equation 3 is minimized.

Equations 1, 2, 3 and 4 will be described in more detail below.

Equation 1 may mean an energy function ($E_{data}$) about the distance between feature points.

Assuming that $\{f_k^M, f_k^I\}$ is a pair of $k^{th}$ matched feature points in the spherical coordinate system, $f_k^M$ and $f_k^I$ may correspond to a focus image and a context image, respectively.

In Equation 1, j means vertex indices having a mesh face including the point $f_k^I$, $\hat{v}_{j,k}$ means each vertex of the mesh face, and $w^f_{j,k}$ means a barycentric weight of $f_k^I$ for $\hat{v}_{j,k}$.

In Equation 2, the vertex v1 may be defined using the vertexes v2 and v3. Here, (u, v) may mean a local coordinate of an initial mesh grid before the warping, and $R_{90}$ may mean a matrix corresponding to 90-degree rotation.

$\hat{v}_1$, $\hat{v}_2$ and $\hat{v}^3$ may mean warped vertexes of a mesh triangle, respectively.

Equation 3 may mean an energy function according to Equation 2.

Equation 4 may mean the sum of the energy calculated by Equation 1 and the energy calculated by Equation 3.

In Equation 4, a may mean a spatial smoothness weight.

The second image data may be transformed, namely warped, in a direction along which the energy calculated by Equation 4 is minimized.

Figure 10:
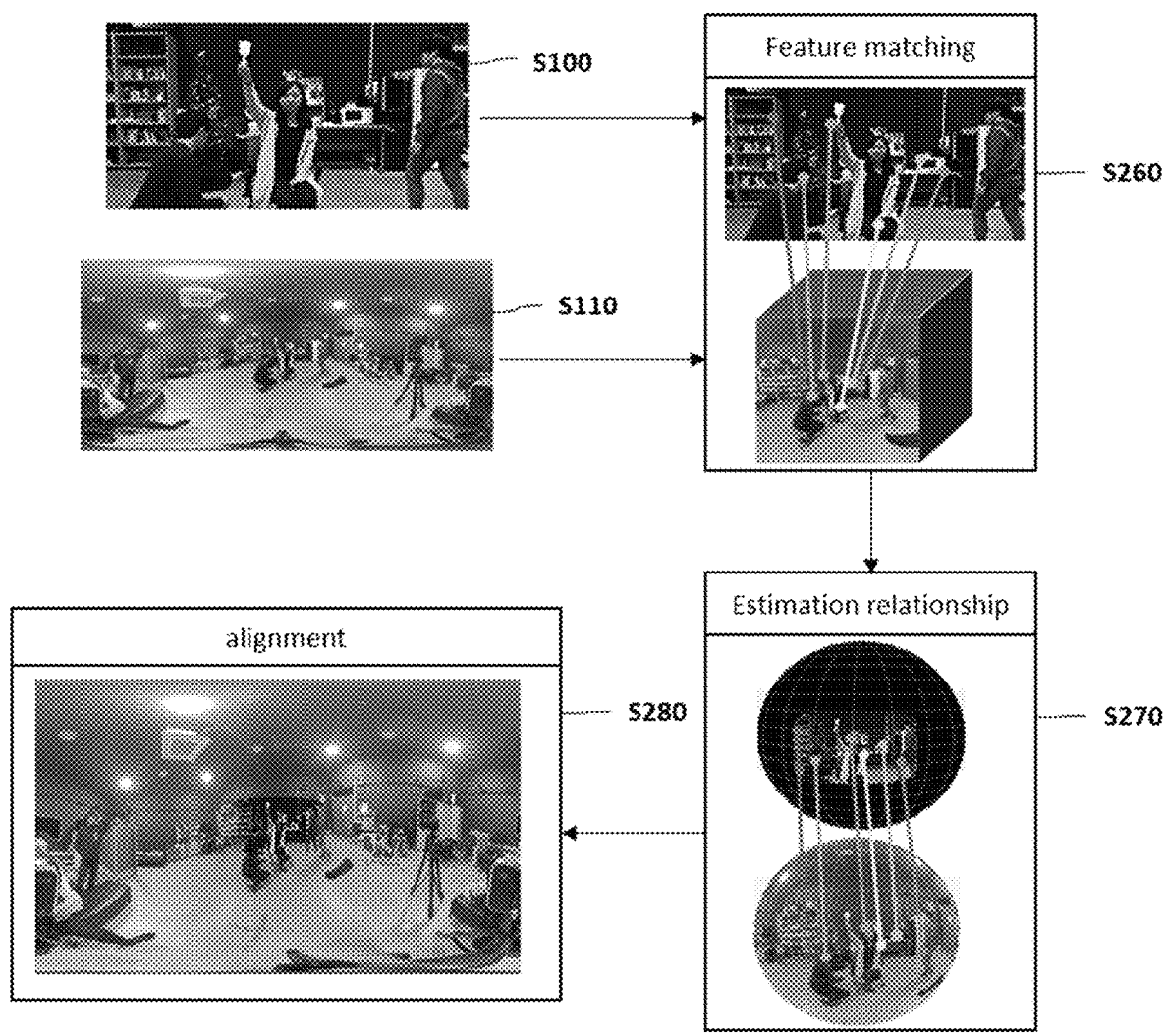

As shown in FIG. 10, the aligning step S200 according to the second method includes a feature point extraction and matching step S260, a location relationship checking step S270, and an image aligning step S280.

In the feature point extraction and matching step S260, first, the coordinate systems of two image data are matched. To do this, the second image data expressed in the spherical coordinate system is transformed into cube second image data, which is a cube map coordinate system image with six surfaces expressed based on the planar coordinate system. In addition, based on the color information, the feature point of the cube second image data and the feature point of the first image data are matched.

The feature point extracted from the first image data is defined as a first feature point $\{P_{pers}\}$ and the feature point extracted from the cube second image data ($C_{pano}$) is defined as a second feature point $\{P_{pano}\}$.

In the location relationship checking step S270, the scale of the frame size between two image data is calculated based on an average distance between the matched feature points. The scale value is proportional to a radius of the sphere when the image is expressed by the spherical coordinate system, namely a focal length at the camera.

In addition, the feature point included in the first image data having the planar coordinate system is transformed into the spherical coordinate system through the calculated scale value, and the feature point included in the planar second image data transformed from the spherical coordinate system to the planar coordinate system is transformed again into the spherical coordinate system. For this, a reprojection transforming technique may be used.

Also, a spatial location relationship of the first image data and the second image data is checked using the feature points expressed in the same coordinate system. After an essential matrix between two spherical coordinate system images is obtained using the eight-point algorithm proposed by Richard I. Hartley, the singular value decomposition algorithm is used to decompose the essential matrix into a translation vector $\vec{t}$ and a rotation matrix R.

In the image aligning step S280, a rotation difference value of two image data is found through the rotation matrix R, and the obtained rotation difference value is applied to the second image data to eliminate the rotational transforming difference between the first image data and the second image data. That is, it is possible to obtain the first image data and the second image data that are aligned as much as possible.

In the present disclosure, since the first image data and the second image data are aligned by estimating the location relationship between two images, it is possible to align images of the two coordinate systems just by using two image data even though the camera does not perform the calibration process between the spherical coordinate system and the planar coordinate system.

After the aligning step S200, the aligned second image data may be warped (the first warping step S300). In other words, the warped second image data may be warped corresponding to the first image data.

The first warping step S300 is similar to the former aligning step S200 in the point that the second image data is transformed (warped). However, the first warping step S300 and the aligning step S200 may perform different warping methods. To distinguish these warping steps, these warping steps may be called a first warping step and a second warping step.

Figure 11:
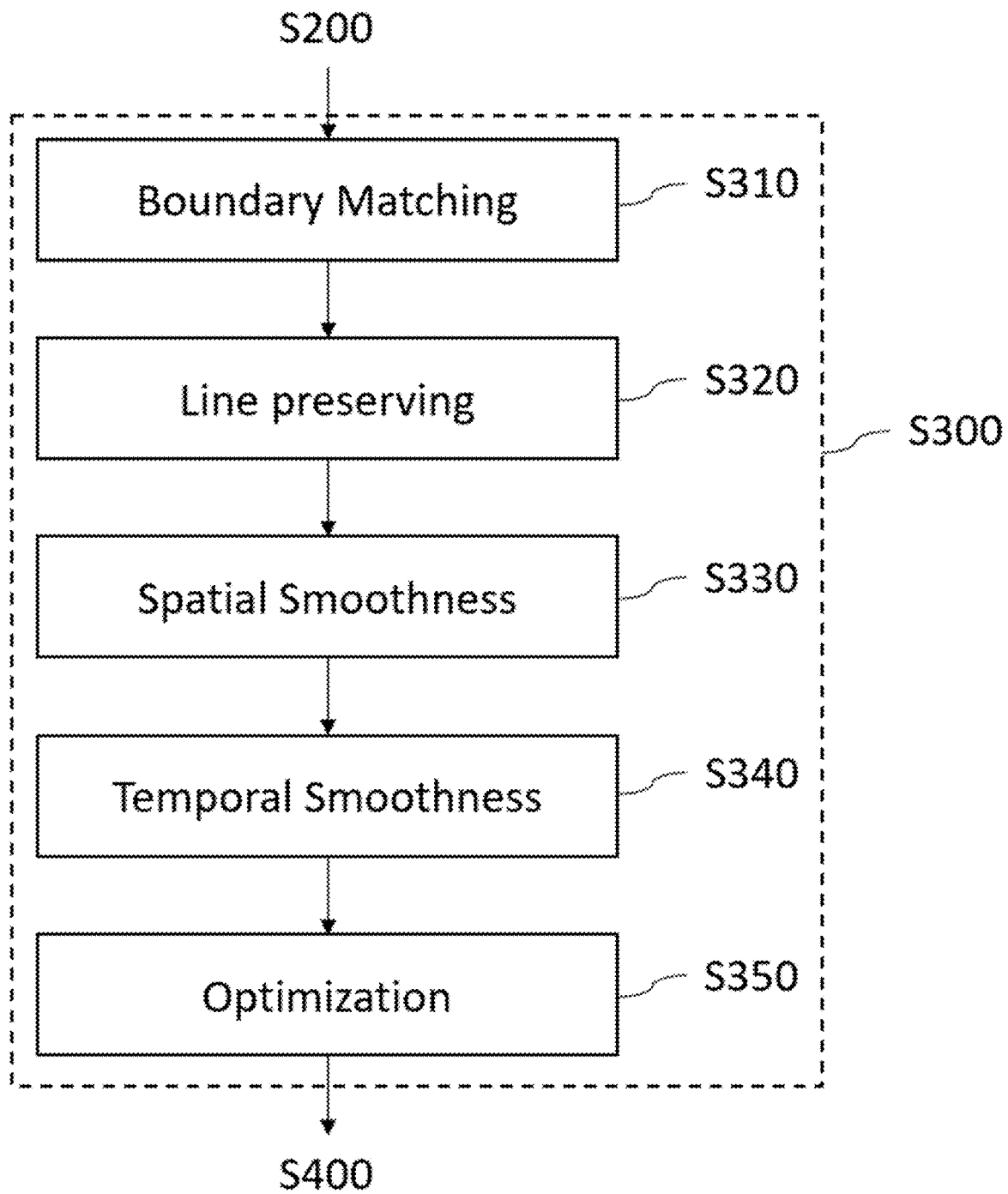

In the first warping step S300, as shown in FIG. 11, boundaries of the image according to the first image data and the image according to the transformed (warped) second image data may be matched (a boundary matching step S310), and line distortion may be corrected in the image according to the second image data (a line preserving step S320), spatial smoothness may be secured (S330), temporal smoothness may be secured (S340), and then the optimization may be performed in a direction along which the sum of the energy calculated in each step is minimized (an optimization step S350).

The first warping step S300 will be described as follows with reference to FIG. 12.

The aligned second image data may be warped in a direction along which the sum (Equation 9) of the energy calculated by Equation 5, the energy calculated by Equation 6, the energy calculated by Equation 7 and the energy calculated by Equation 8 is minimized.

Equations 5, 6, 7, 8 and 9 will be described in more detail below.

Equation 5 may mean an energy function ($E_b$) for a distance between predetermined target points of a frame of the aligned second image data and a frame of the first image data corresponding thereto.

This will be described in more detail as follows with reference to FIG. 13.

Seeing FIG. 13, the portion (A) may be an image for a predetermined first frame F1 according to the first image data, and the portion (B) may be an image for a second frame F2 corresponding to the first frame F1 according to the aligned second image data.

In a state where the first image data is not transformed for the resolution of the panoramic image, in the second image data aligned to stitch the second image data aligned with the first image data, data of a portion BA adjacent to the image according to the first image data may be transformed.

A portion BA of the aligned second image data adjacent to the image according to the first image data may be called a boundary area.

Here, the boundary area BA may be partially overlapped with the first image data and also partially overlapped with the aligned second image data.

The portion (A) of FIG. 14 shows the boundary area BA, namely a masking area ($\varphi(I_t^B)$), and the portion (B) of FIG. 14 shows an area corresponding to the first image data ($\varphi(I_t^M)$) transformed into the spherical coordinate system.

Considering the above, ($\varphi(I_t^B)$) may be regarded as a pixel point positioned in the boundary area BA.

Assuming that $b_k^M$ is a $k^{th}$ target point in the first image data and $b_k^I$ is a $k^{th}$ target point matching with $b_k^M$ in the aligned second image data, in Equation 5, j means vertex indices having a mesh face including the point $b_k^I$, $\hat{v}_{j,k}$ means each vertex of the mesh face, and $w_{j,k}^b$ means a barycentric weight of $b_k^I$ for $\hat{v}_{j,k}$.

Since Equation 5 has a structure similar to Equation 1 above, Equation 5 may be fully interpreted from Equation 1.

From Equation 5, it may be checked that the first image data and the aligned second image data may be matched well in the boundary area BA as the distance between the target point of the first image data and the target point of the aligned second image data corresponding thereto is smaller in the boundary area BA.

The line preserving step S320 will be described below with reference to FIGS. 15 and 16.

Figure 15:
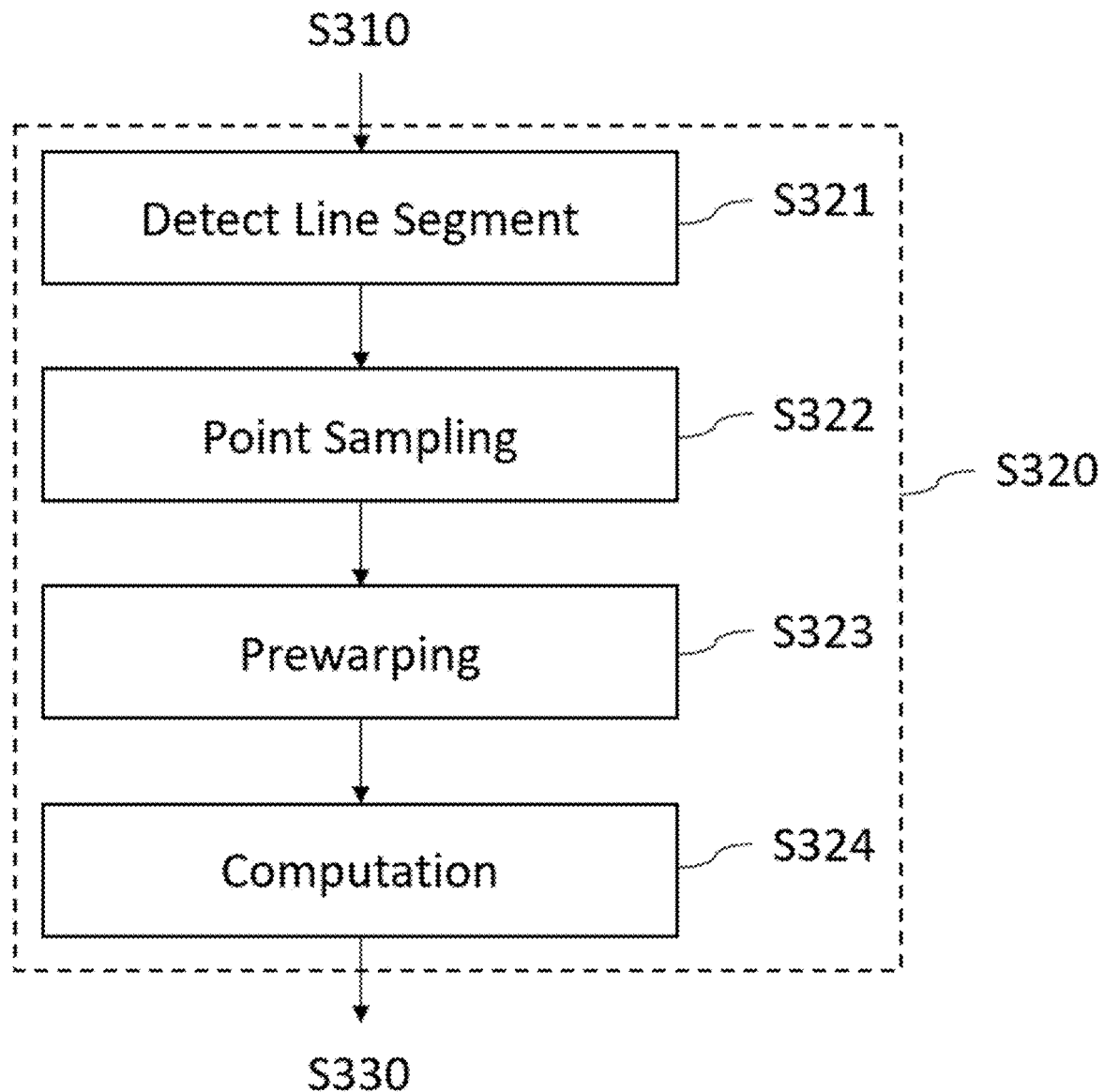
Figure 16:
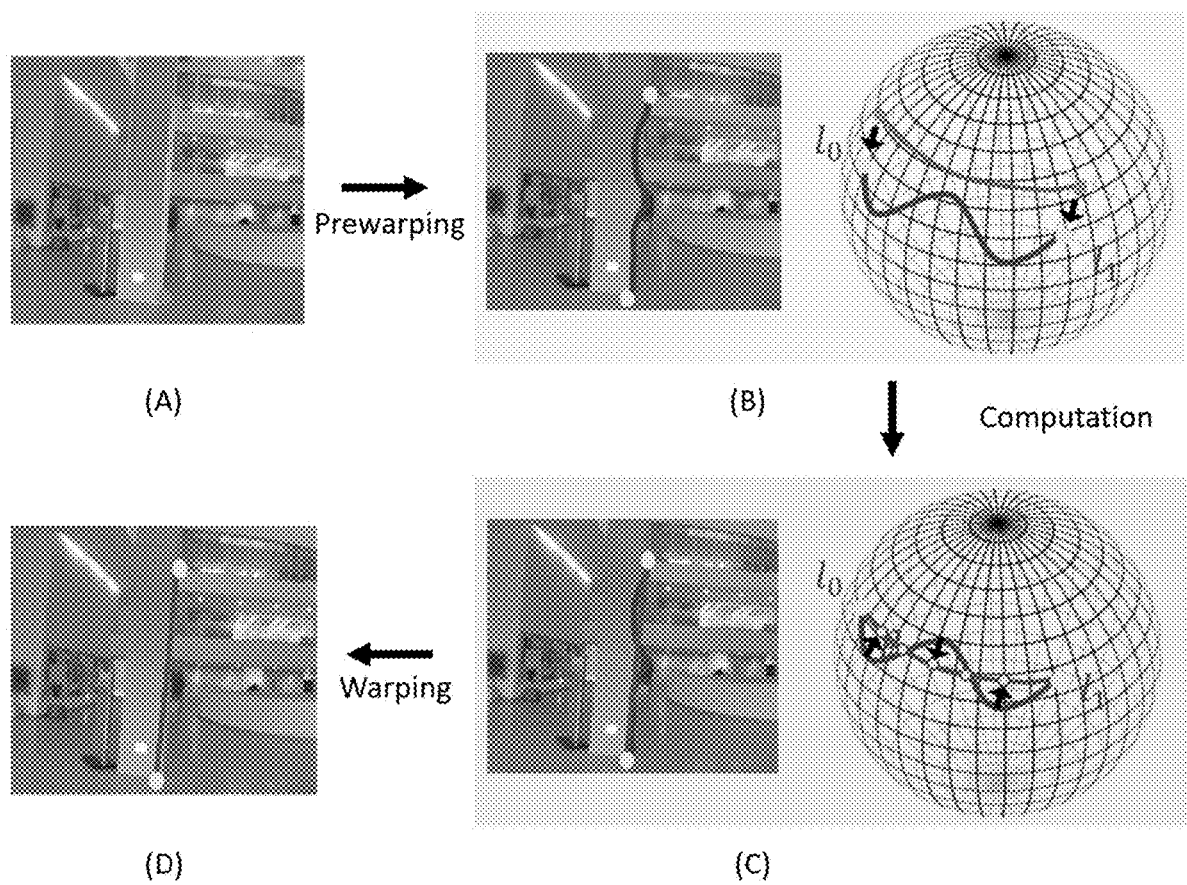

Referring to FIGS. 15 and 16, the line preserving step S320 may include detecting a line segment (S321). For example, as shown in the portion (A) of FIG. 16, a portion having line type data, namely a line segment, may be detected in the aligned second image data.

After that, a predetermined point may be sampled from the detected line segment (a sampling step S322). Referring to the portion (A) of FIG. 16, points included in the detected line segment, for example a starting point and an ending point of the line segment, may be sampled.

After that, the sampled points may be prewrapped (a prewarping step S323).

In detail, as shown in the portion (B) of FIG. 16, since the aligned second image data has the spherical coordinate system, if the sampled points are prewrapped, the prewrapped sampled points may have a planar coordinate system. Since the spherical coordinate system is displayed on a curved surface, if the spherical coordinate system is transformed into the planar coordinate system, an error may be generated due to the geometrical difference between the curved surface and the planar surface.

In the portion (B) of FIGS. 16, 10 and 11 may mean a starting point and an ending point of the line segment.

After that, the distance between the sampled points is calculated from the result of prewarping (S324), and as shown in the portion (C) of FIG. 16, the aligned second image data may be warped in a direction along which the distance between the sampled points is decreased, preferably minimized.

If so, as shown in the portion (D) of FIG. 16, it is possible to suppress that the line segment is distorted.

The energy function (Equation 6) in the line preserving step (S320) described above will be described below with reference to FIG. 12.

Equation 6 basically has a structure similar to Equation 5.

In Equation 6, $l_k$ may mean a $k^{th}$ line segment on the aligned second image data represented in the spherical coordinate system.

The case where the line segment is corrected in the above and the case where the line segment is not corrected as described above will be described below with reference to FIGS. 17 and 18.

Figure 17:
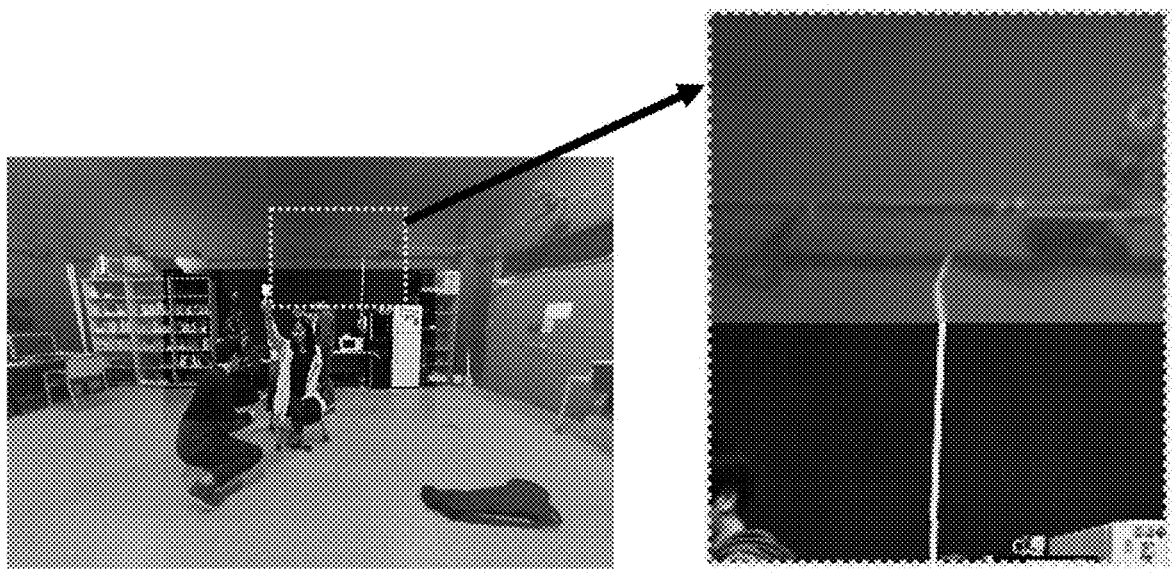

FIG. 17 may correspond to the result in which the aligned second image data is warped not in the direction according to Equation 6. Seeing a region marked by a yellow dotted line in FIG. 17, it may be found that a predetermined line looks curved at the boundary portion of the image according to the first image data and the image according to the second image data.

Figure 18:
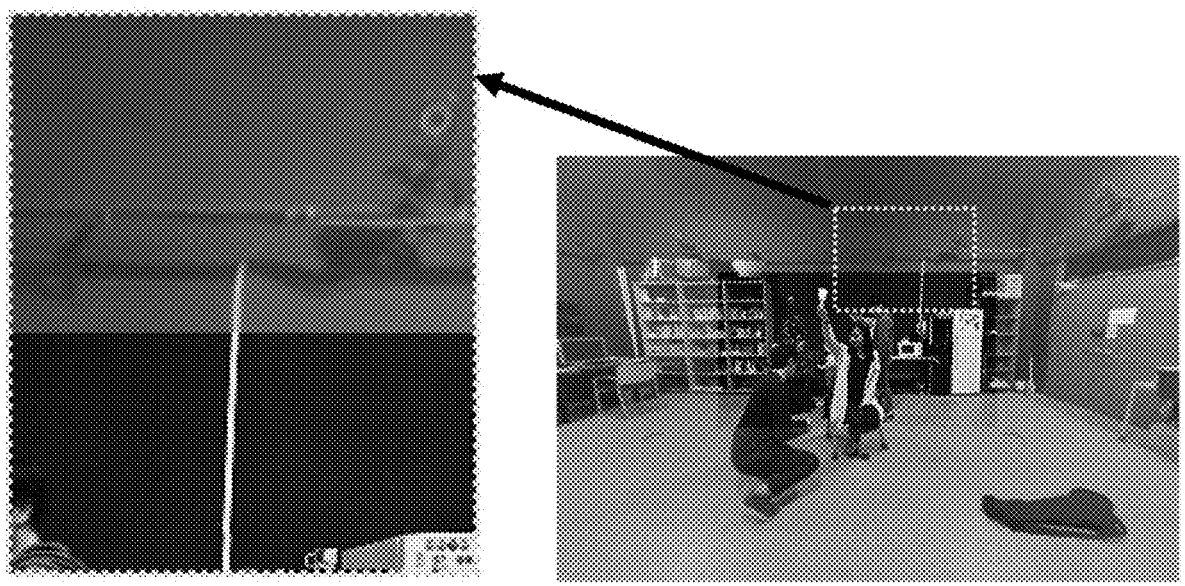

Meanwhile, if e aligned second image data is warped in the direction according to Equation 6 under the same condition, as shown in FIG. 18, the line distortion may be improved.

The spatial smoothness step S330 may be performed in the direction along which the energy calculated by Equation 7 of FIG. 12 is minimized.

Since Equation 7 has a structure similar to Equations 2 and 3 above, Equation 7 may be fully interpreted from Equations 2 and 3.

The temporal smoothness step S340 may be performed in the direction along which the energy calculated by Equation 8 of FIG. 12 is minimized.

In Equation 8, W may mean a window size.

Equation 9 inferred in the optimization step S350 may be interpreted as the aligned second image data is warped in a direction along which the sum (Equation 9) of the energy calculated by Equation 5, the energy calculated by Equation 6, the energy calculated by Equation 7 and the energy calculated by Equation 8 is minimized. Here, $\lambda_l$, $\lambda_s$ and $\lambda_t$ may mean weights of the energies, respectively.

Figure 19:
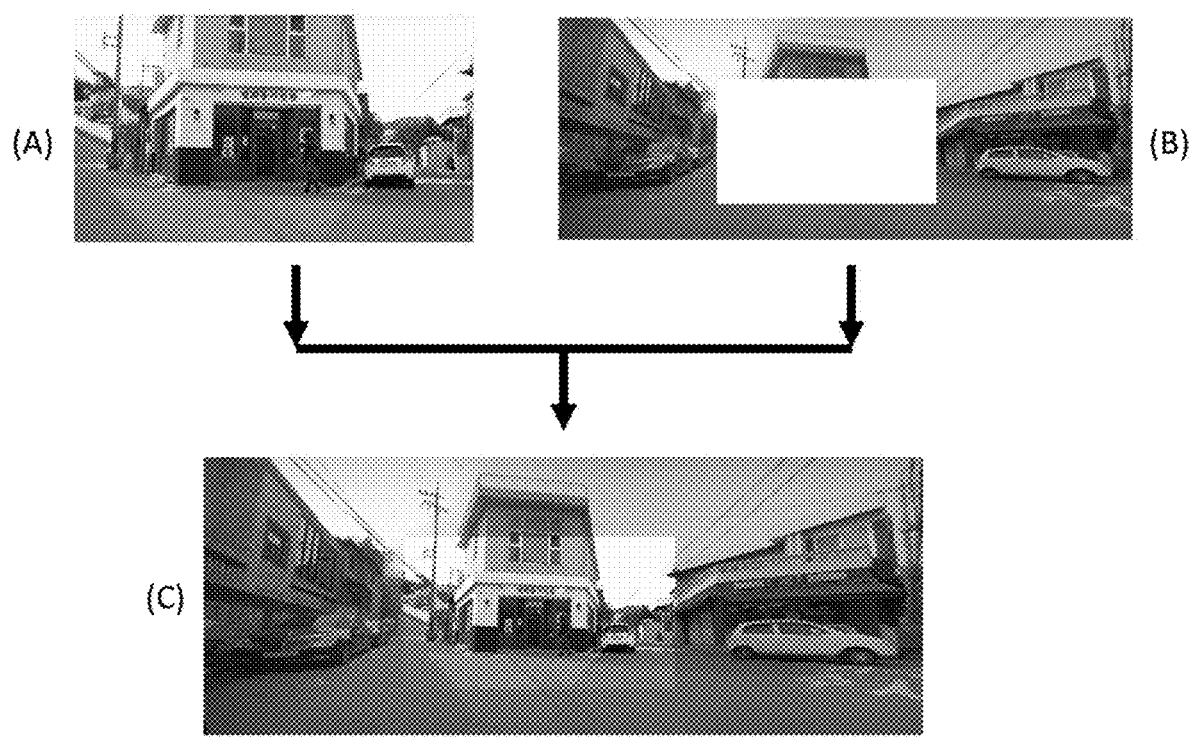

Referring to FIG. 19, the aligned second image data may be warped according to the method described above, the warped data may be stitched to the first image data, and the image according to the stitched image data may be displayed on the display.

In this case, a viewer may watch low definition image (the context image) around the focus image while watching the image (the focus image) according to the high definition first image data. In other words, the viewer may check information about the surrounding situation of the focus image by means of the context image while concentrating on the focus image. Accordingly, it is possible to suppress that the immersion degree of the viewer is deteriorated.

Moreover, it is possible to prevent the data size of the panoramic image where the focus image and the context image are stitched from increasing excessively.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An image processing method using image data of a planar coordinate system and image data of a spherical coordinate system, comprising:

an inputting step of inputting first image data represented by the planar coordinate system and second image data represented by the spherical coordinate system;
an aligning step of aligning the second image data to the first image data;
a first warping step of warping the aligned second image data;
a stitching step of stitching the first image data and the warped second image data; and
a displaying step of displaying an image according to the stitched image data,
wherein the aligning step comprises:
  a first transforming step of transforming the second image data to planar second image data represented by the planar coordinate system;
  a matching step of matching a feature point of the planar second image data with a feature point of the first image data;
  a second transforming step of transforming the planar coordinate information about the feature point of the planar second image data and the feature point of the first image data, which are matched, into spherical coordinate information; and
  a second warping step of warping the second image data based on difference information of the spherical coordinate information of the feature points transformed in the second transforming step.

2. The image processing method of claim 1,
wherein the image according to the first image data corresponds to a first area of a display area,
wherein the image according to the warped second image data corresponds to a second area including the first area.

3. The image processing method of claim 1, wherein the resolution of the image according to the first image data is higher than the resolution of the image according to the second image data.

4. The image processing method of claim 1, wherein the image according to the first image data and the image according to the second image data are captured by different cameras.

5. The image processing method of claim 4, wherein the image according to the second image data is captured by a panoramic camera.

6. The image processing method of claim 1, wherein in the aligning step, the second image data is transformed so that the second image data is aligned to the first image data.

7. The image processing method of claim 1, wherein in the second warping step, the warped second image data is warped corresponding to the first image data.

8. The image processing method of claim 7, wherein the second warping step further includes a boundary matching step of matching boundaries of the image according to the first image data and the image according to the transformed second image data.

9. The image processing method of claim 7, wherein the second warping step further includes a line preserving step of correcting line distortion in the image according to the second image data.

10. The image processing method of claim 1, wherein the first transforming step comprises transforming the second image data to cube second image data that is a cube map coordinate system image with six surfaces, represented based on the planar coordinate system; wherein the matching step comprises matching a feature point of the cube second image data and a feature point of the first image data.

11. An image processing apparatus using image data of a planar coordinate system and image data of a spherical coordinate system, comprising:
  a first camera corresponding to first image data represented by the planar coordinate system;
  a second camera corresponding to second image data represented by the spherical coordinate system;
  a driver configured to align the second image data to the first image data, warp the aligned second image data, and then stitch the first image data and the warped second image data for obtaining a stitched image data; and
  a display configured to display an image according to the stitched image data,
wherein the driver transforms the second image data to planar second image data represented by the planar coordinate system, matches a feature point of the planar second image data with a feature point of the first image data, transforms the planar coordinate information about the feature point of the planar second image data and the feature point of the first image data, which are matched, into spherical coordinate information, and then warps the second image data based on difference information of the spherical coordinate information of the feature points transformed.

12. The image processing apparatus of claim 11, wherein the driver comprising:
  an aligning part configured to align the second image data to the first image data;
  a warping part configured to warp the second image data aligned by the aligning part; and
  a stitching part configured to stitch the first image data and the warped second image data,
wherein the display displays the image according to the stitched image data.

13. The image processing apparatus of claim 11,
wherein the resolution of the image according to the first image data is higher than the resolution of the image according to the second image data,
wherein the second camera is a panoramic camera.

14. An image processing method using image data of a planar coordinate system and image data of a spherical coordinate system, comprising steps of:
  inputting first image data represented by the planar coordinate system and second image data represented by the spherical coordinate system;
  aligning the second image data to the first image data;
  first warping the aligned second image data; and
  stitching the first image data and the warped second image data,
wherein the aligning step comprises:
  a first transforming step of transforming the second image data to planar second image data represented by the planar coordinate system;
  a matching step of matching a feature point of the planar second image data with a feature point of the first image data;
  a second transforming step of transforming the planar coordinate information about the feature point of the planar second image data and the feature point of the first image data, which are matched, into spherical coordinate information; and
  a second warping step of warping the second image data based on difference information of the spherical coordinate information of the feature points transformed in the second transforming step.

15. The image processing method of claim 14,
wherein the image of the first image data corresponds to a first area of a display area,
wherein the image of the warped second image data corresponds to a second area including the first area.

16. The image processing method of claim 14, wherein the resolution of the image of the first image data is higher than the resolution of the image of the second image data.

17. The image processing method of claim 15, wherein the image of the first image data and the image of the second image data are captured by different cameras.

18. The image processing method of claim 17, wherein the image of the second image data is captured by a panoramic camera.

19. The image processing method of claim 14, wherein in the aligning the second image data to the first image data, the second image data is transformed so that the second image data is aligned to the first image data.

* * * * *